United States Patent [19]

Rings et al.

[11] Patent Number: 5,505,223
[45] Date of Patent: Apr. 9, 1996

[54] ARRANGEMENT AND A METHOD FOR DISPENSING POWDER DIRECTLY FROM A RETAIL CONTAINER

[75] Inventors: Friedel Rings, Monheim; Peter Holz, Duesseldorf, both of Germany

[73] Assignee: Henkel Kommanditgesellschaft auf Aktien, Duesseldorf, Germany

[21] Appl. No.: 185,877

[22] PCT Filed: Jul. 17, 1992

[86] PCT No.: PCT/EP92/01633

§ 371 Date: Mar. 28, 1994

§ 102(e) Date: Mar. 28, 1994

[87] PCT Pub. No.: WO93/03218

PCT Pub. Date: Feb. 18, 1993

[30] Foreign Application Priority Data

Jul. 26, 1991 [DE] Germany ............................ 41 24 912.7

[51] Int. Cl.$^6$ ...................................................... B01F 3/12
[52] U.S. Cl. ............................... 137/15; 137/268; 134/93
[58] Field of Search ........................ 137/268, 896, 137/1, 15; 134/93

[56] References Cited

U.S. PATENT DOCUMENTS

| | | |
|---|---|---|
| 3,188,146 | 6/1965 | Cordes . |
| 3,570,717 | 3/1971 | Olson . |
| 3,607,105 | 9/1971 | Reid et al. ........................... 137/268 X |
| 3,951,462 | 4/1976 | De Francisci . |
| 4,020,865 | 5/1977 | Moffat et al. . |
| 4,357,953 | 11/1982 | Patterson ............................ 137/268 X |
| 5,100,032 | 3/1992 | Burdorf et al. ..................... 137/268 X |

FOREIGN PATENT DOCUMENTS

| | | |
|---|---|---|
| 8802503 | 4/1988 | WIPO . |
| 8900021 | 1/1989 | WIPO . |

*Primary Examiner*—Martin P. Schwadron
*Assistant Examiner*—Kevin L. Lee
*Attorney, Agent, or Firm*—Ernest G. Szoke; Wayne C. Jaeschke; Kenneth Watov

[57] ABSTRACT

The invention provides an apparatus for enabling stock washing liquor to be prepared from washing-agent powder taken directly from the powder container containing it, without producing any dust, and to store the liquor thus prepared for supply to at least one industrial wet vacuum cleaner. The apparatus includes a tub-shaped bottom section and a top section which is hermetically mounted on the bottom section. A suction line leads into the container, the end remote from the container being inserted into the powder in the powder container. A fresh-water line also terminates in the container. The water is directed onto the stream of powder passing through the suction line. A stock-liquor feed line is operatively linked to a pump to permit liquor to be pumped from an inlet near the floor of the container and out of the container.

26 Claims, 6 Drawing Sheets

ARRANGEMENT AND A METHOD FOR DISPENSING POWDER DIRECTLY FROM A RETAIL CONTAINER

This application is related to co-pending applications Attorney Dkt. No. D9530-I PCT/US, for DEVICE FOR PREPARING A STOCK WASHING LIQUOR"; and Attorney Dkt. No. D9530 -II PCT/US, for DEVICE FOR HOLDING A POWDER CONTAINER.

BACKGROUND

1. Field of the Invention

This invention relates to an apparatus for directly preparing a stock liquor from a powder container for supplying institutional dishwashing or washing machines, and to a method for directly preparing a stock liquor from a powder container for supplying institutional dishwashing or washing machines.

2. Discussion of Related Art

It is known that a stock liquor tank containing a detergent solution can be provided for supplying institutional washing or dishwashing machines with the detergent solution. The detergent solution is pumped as required from the stock liquor tank into the washing or dishwashing machines. To prepare the stock liquor from a powder or powder-form detergent, a metering unit is associated with the stock liquor tank. The powder is poured into the metering unit from a powder container or the powder container as a whole is introduced into the metering unit and slit open. Powder-form detergent is delivered in batches from the metering unit into a dispensing trough in which it mixes with inflowing water to form the stock liquor forming the detergent solution for the washing or dishwashing machine. The stock liquor is then directly introduced into the stock liquor tank. The detergent solution is removed from the stock liquor tank in accordance with the requirements of the particular washing or dishwashing process.

Filling the metering unit with the powder-form detergent is not without problems. It is frequently accompanied by dust emission which is unpleasant and a health hazard to the machine operator, particularly in the case of the strongly alkaline detergent powders typically used for dishwashing. Unwanted dust emission can occur both during the introduction of powder containers into the metering unit and during the pouring or scooping of powder from the container into the metering unit.

The holding capacity of known metering units for supplying known stock liquor tanks with powder-form detergent is typically 5 kg so that only 5 kg powder containers can be accommodated in the metering units. In addition, the powder is normally removed from the metering units and the powder/water mixture delivered to the stock liquor tank under the effect of gravity. Accordingly, the metering units are normally arranged above a stock liquor tank. This prevents the holding capacity of the metering units from being increased as required unless holders of complicated construction are provided for the metering unit.

SUMMARY OF THE INVENTION

The problem addressed by the present invention is to enable a stock liquor to be directly prepared from the powder container holding powder-form detergent without any dust emission and to keep the stock liquor ready for supplying institutional dishwashing or washing machines.

In an apparatus of the type mentioned previously, this problem has been solved in accordance with the invention by a type of conventional wet vacuum cleaner consisting of a tub-like lower part and—sealingly mounted thereon—an upper part with an integrated suction blower for generating a reduced pressure in the lower part of the stock liquor tank, a suction line leading into the stock liquor tank which, at its end remote from the stock liquor tank, dips into the powder in the powder container, a fresh water line which opens into the stock liquor tank, and of which the water outlet opening is directed onto a stream of powder to be drawn through the suction line and a stock liquor line operatively connected to a pump and leading out from the stock liquor tank with a stock liquor inflow at the bottom of the tank.

With the arrangement according to the invention, powder-form detergent can be directly transported from the powder container, which is also the retail container, into the stock liquor tank without any emission of dust. In the stock liquor tank, water from a fresh water line is added to the stream of powder drawn through the suction line to prepare the stock liquor forming the detergent solution for institutional dishwashing or washing machines. Accordingly, the preparation of a stock liquor from powder-form detergent and the supply of institutional dishwashing or washing machines with this stock liquor is as simple and safe in its handling as the dispensing of liquid detergent. There is no longer any need for powder-form detergent to be transferred from the powder container to a metering unit, for example by pouring or by scooping.

Compared with known metering units, the quantity of powder which can be accommodated in the metering unit is considerably increased. Instead of the usual 5 kg of powder, powder can now be directly removed from large powder containers, for example 25 kg or even 200 kg bags. This affords the further advantage that the arrangement according to the invention—as a central unit in the form of a powder dispenser—has the capacity to supply several dishwashing or washing machines.

The stock liquor can be directly pumped from the stock liquor tank through the stock liquor line. The stock liquor line operatively connected to a pump is provided for this purpose.

To enable an institutional dishwashing or washing machine to be directly supplied with stock liquor from the stock liquor container, another embodiment of the invention is characterized in that the stock liquor line is connected to at least one institutional dishwashing or washing machine.

To ensure that the powder drawn into the stock liquor tank through the suction line and issuing from the suction line is not deposited on the inside wall of the lower part of the tank when the jet of water from the fresh water line impinges on the powder, a further embodiment of the invention is characterized in that the opening of the suction line on the inside of the stock liquor tank is arranged at a distance from the point where the suction line enters the lower part.

In another embodiment of the invention, the opening of the suction line on the inside of the stock liquor tank is positioned below the point where the suction line enters the lower part, and the opening of the fresh water line on the inside of the stock liquor tank is likewise positioned below the point of entry of the suction line and/or outside the suction line. Accordingly, when the fresh water continues flowing, particularly after the suction blower has been switched off, water is prevented from entering the suction line and flowing into the powder container, for example through the suction line. The fresh water is prevented from flowing back against gravity by the difference in level between the point of entry and the opening of the suction and/or the separation of the water and powder inlets.

In another particularly advantageous embodiment of the invention, the suction line comprises an elbow or bend directed downwards to the bottom of the stock liquor tank in an extension on the inside thereof.

Another embodiment of the invention which ensures that the powder and fresh water are thoroughly mixed in characterized in that, in an extension on the inside of the stock liquor tank with an outlet opening directed towards the bottom thereof, the fresh water line opens into a bend and, after the bend, the suction line continues to a point situated close to the inner wall of the lower part. This is another measure which prevents the fresh water introduced into the suction line from flowing back. In addition, the fact that, after the bend, the suction line continues to a point situated near the inner wall of the lower part ensures that the powder/water mixture impinges on the inner wall at that point so that the powder particles are mechanically stressed and disintegrate, thus accelerating their dissolution in the prepared stock liquor.

Another embodiment of the invention is characterized in that, in its extension on the inside of the stock liquor tank with the bend, the suction line terminates in the longitudinal axis of the lower part with its opening directed towards the bottom of the tank and, in its extension on the inside of the stock liquor tank, the fresh water line is formed above the opening by a ring line concentrically surrounding the opening and delivering a jet of water directed onto the stream of powder issuing from the suction line from preferably four nozzles inclined at an angle of preferably 45° for a flat-jet opening angle of preferably 65°. In this embodiment, too, the powder issuing from the suction line can readily be made up into the stock liquor.

To ensure that overly large undissolved powder particles do not enter the stock liquor line, another embodiment of the invention is characterized in that a filter plate is arranged in the lower part below the opening of the suction line on the inside of the stock liquor tank.

Another embodiment of the invention is characterized in that, for pumping off the stock liquor from the stock liquor tank, an immersion pump with an intake opening below the filter plate towards the bottom of the tank, and a delivery opening communicating with the second stock liquor line on the pressure side is arranged in the lower part. In this way, a pump for supplying institutional dishwashing or washing machines with stock liquor prepared in the stock liquor tank can readily be integrated in the stock liquor tank in a space-saving arrangement.

To whirl or stir up powder particles which have settled on the filter plate but have not yet dissolved, another embodiment of the invention is characterized in that the stock liquor line has branches in the lower part of which the openings are directed onto the top of the filter plate.

In another embodiment of the invention, at least one pump, preferably in the form of a diaphragm pump or flow-inducing pump, is arranged in the stock liquor line outside the stock liquor tank.

Another embodiment of the invention is characterized in that, instead of or in addition to the branches of the stock liquor line, a propeller stirrer or stirring rod is rotatably mounted above the filter plate in the stock liquor tank to whirl or stir up any powder particles which have settled on the filter plate.

In another embodiment of the invention, the base of the lower part comprises an outlet with a stock liquor line connected thereto. This is particularly useful when a membrane pump or flow inducing pump is arranged in the stock liquor line for the measured delivery of stock liquor to institutional dishwashing or washing machines.

To supply several institutional dishwashing or washing machines with stock liquor from the arrangement according to the invention, the invention is further characterized in that the stock liquor line comprises branches outside the stock liquor tank for supplying several dishwashing or washing machines.

To prevent the liquid levels inside the stock liquor tank from rising to such an extent that stock liquor can enter the suction line, or falling to such an extent that the intake opening of the immersion pump is left dry or the stock liquor line runs dry into the vicinity of a pump arranged therein, another embodiment of the invention is characterized in that two level control electrodes are arranged on the inner wall of the lower part.

In another embodiment of the invention, the stock liquor tank can be made mobile by mounting on a frame comprising wheels and a handle in the form of a handcart or trolley.

To complete the mobile unit, another embodiment of the invention is characterized in that a mains coupling unit and electrical switches are arranged on the roller-mounted frame.

Another embodiment of the invention is characterized in that at least one pump is mounted on the frame where it is arranged in the stock liquor line outside the stock liquor tank.

Another advantageous embodiment of the invention is characterized in that, to make it easier to handle, the suction line is flexible and, more particularly, is in the form of a hose.

To ensure that powder is drawn uniformly and continuously into the suction line, another embodiment of the invention is characterized in that, on its side remote from the stock liquor tank, the suction line terminates in a suction lance which dips into the powder container and which comprises a suction pipe and a tubular jacket surrounding the suction pipe with an annular gap inbetween and projecting from the powder container at one end, the suction pipe and the tubular jacket forming an annular nozzle at the end of the suction pipe situated inside the container.

To create a turbulence compartment before the end of the suction lance on the inside of the tank, another advantageous embodiment of the invention is characterized in that, on the inside of the powder container, the suction lance has a cage-like protective basket projecting beyond the end of the suction pipe.

In order to control the amount of powder taken in under suction, another advantageous embodiment of the invention is characterized in that, on its inside, the suction pipe is provided at its lower end with a flow resistance element.

To ensure that the powder is independently and completely removed from its container without any residues being left behind, a further embodiment of the invention is characterized in that the powder container is a bag placed in a trough-like or bucket-like container, a gallows-like bracket being associated with the container on one side and preferably arranged thereon and comprising a holding element preferably depending from a support arm and a guide for the suction lance, the support arm and the guide for the suction lance each being arranged at such a height above the container that the bag is gripped by the holding element at one upper corner, i.e. is held in an upright position, and the suction lance is held—loosely guided by its guide—in a position in which it dips into the powder from above through an opening, more particularly a slot-like opening, in the bag.

To ensure that, as the bag depending from the holding element empties, it assumes an inclined position with the lowest point at one corner of the bag, another embodiment of the invention is characterized in that the holding element is fixed to the support arm or to the gallows-like bracket by a tension element exerting a tensile force, preferably a tension spring. The tension spring is adjusted in its tensile force in such a way that, as the sack is emptied, it is raised or pulled upwards at the upper corner where it is gripped by the holding element.

To enable the powder container to be moved, optionally together with the stock liquor tank, another embodiment of the invention is characterized in that wheels or rollers are fitted to the base of the trough- or bucket-like container.

In the method mentioned above, the solution to the problem stated above is characterized in that powder-form detergent is drawn under suction from the powder container into a stock liquor tank where the stock liquor is prepared by a jet of water directed onto the inflowing stream of powder, and the stock liquor is pumped as required from the stock liquor tank to one or more dishwashing or washing machines.

This method enables a stock liquor to be directly prepared from a powder container, which is also the retail container, without the operator being troubled in any way by dust emission. Further advantages are mentioned in the foregoing in connection with the arrangement according to the invention.

The invention is described in more detail below with reference to the accompanying drawings, in which like items are identified by the same reference designation, wherein:

DETAILED DESCRIPTION OF THE INVENTION

Figure 1:
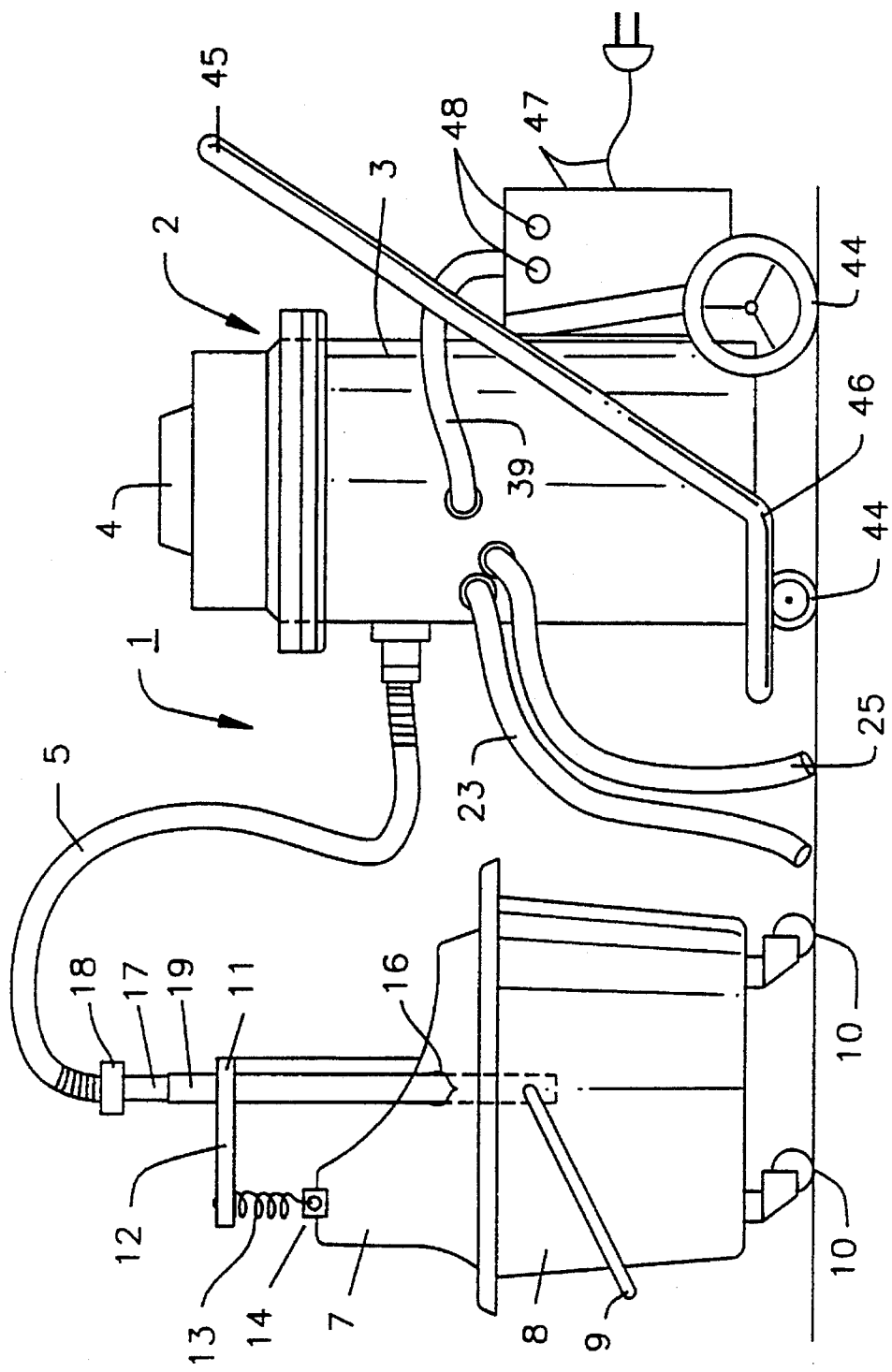
FIG. 1 is a side elevation of a first embodiment of the arrangement according to the invention.
Figure 2:
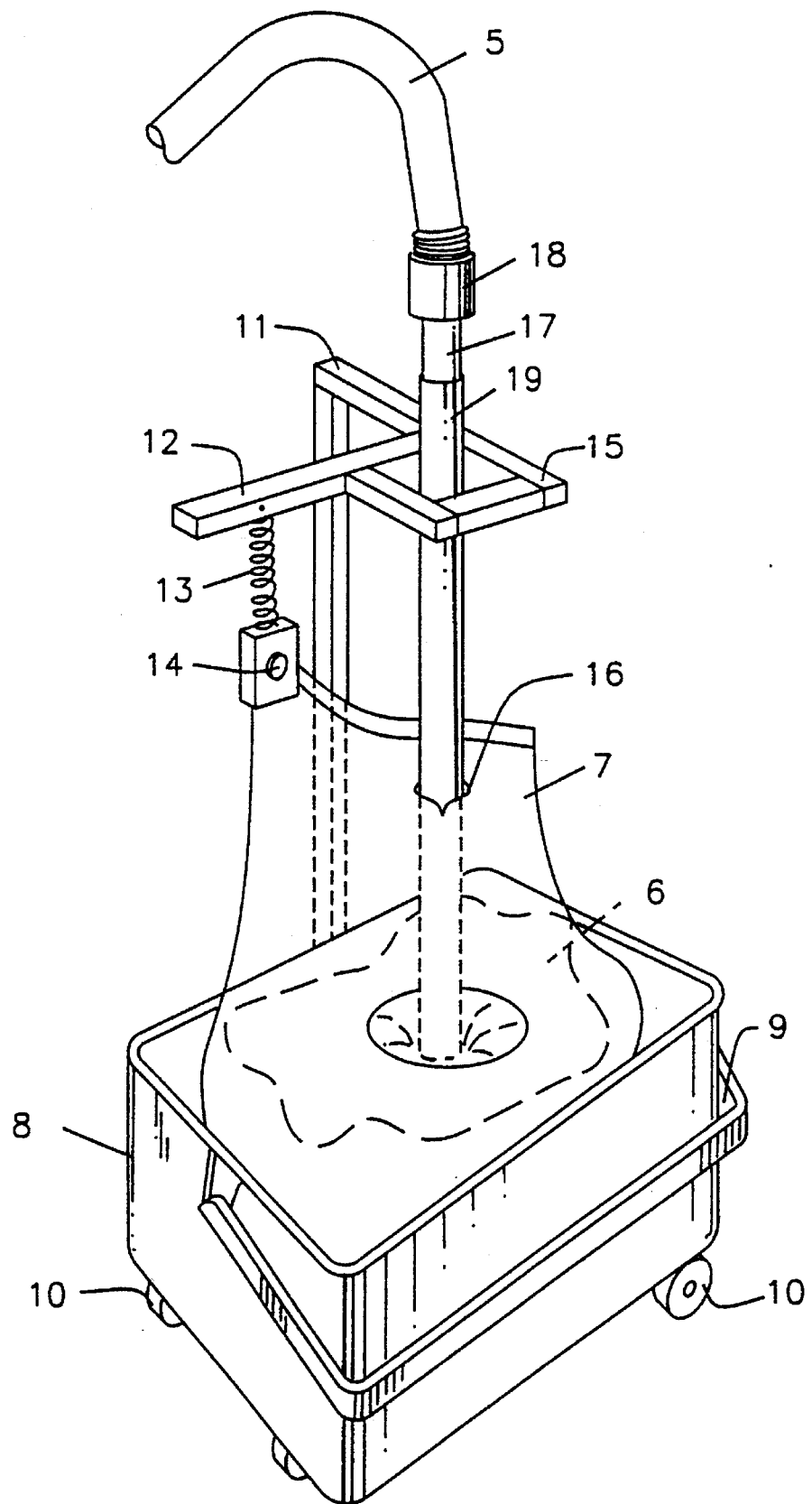
FIG. 2 shows a bag of powder accommodated in a trough-like or bucket-like container with a suction lance immersed therein.
Figure 3:
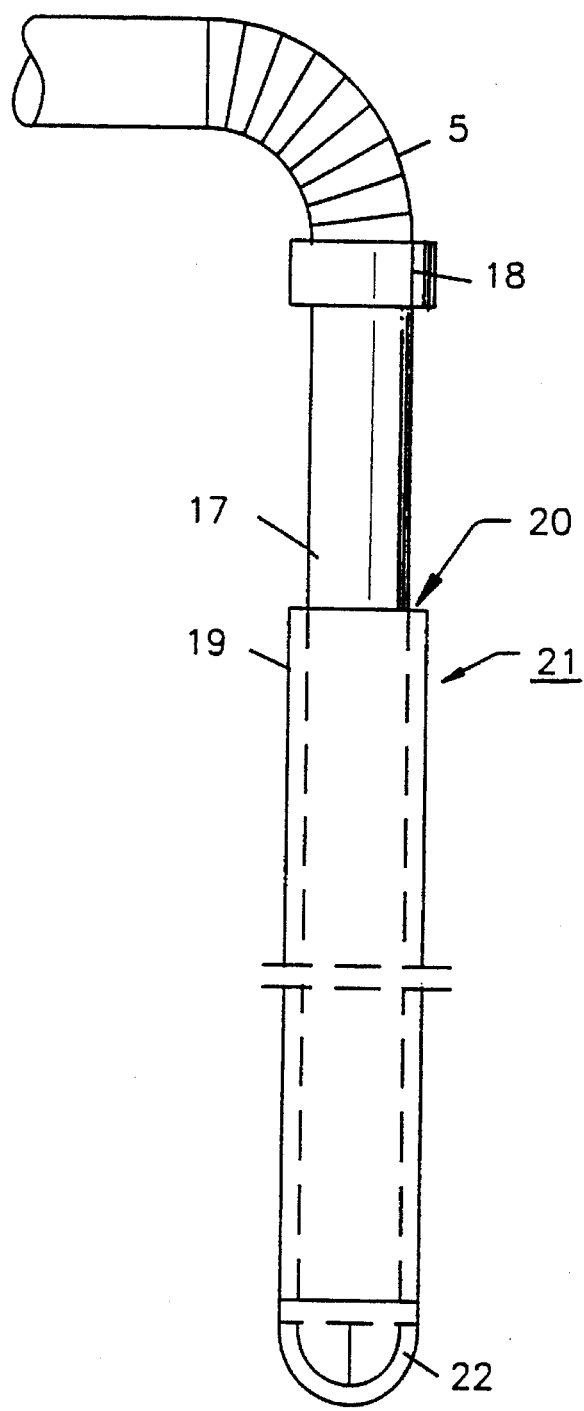
FIG. 3 shows one end of the suction lance.
Figure 4:
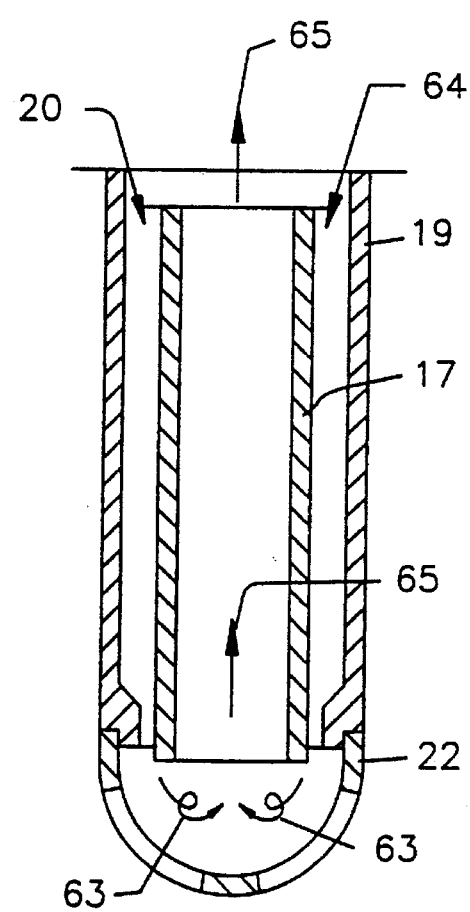
FIG. 4 is a section on a larger scale through the end of the suction lance shown in FIG. 3.

The arrangement globally denoted by the reference 1 in FIG. 1 for directly preparing a stock liquor from a powder container for supplying institutional dishwashing or washing machines consists of a stock liquor tank 2 resembling a conventional wet vacuum cleaner. The stock liquor tank 2 comprises a tub-like lower part 3, and an upper part 4 sealingly mounted on its upper edge with an integrated suction blower for producing a reduced pressure in the lower part 3. A suction line 5 leads into the lower part 3 of the stock liquor tank 2 and, at its end remote from the tank, dips into a powder-form detergent 6 accommodated in a powder container 7 in the form of a bag 7 (see FIG. 2). The powder container is the retail container in which the powder 6 is sold. The powder container 7 in the form of a bag 7 is placed in a trough-like or bucket-like container 8. The trough-like or bucket-like container 8 comprises a pivotally mounted carrying handle 9, and is fitted at its base with four rollers 10 so that the container 8 can be moved even with the bag 7 on board. A gallows-like bracket 11 is fixed to one side of the container 8. In the region of its gallows, the bracket 11 comprises a support arm 12 to which a holding element 14 is dependingly fixed by means of a tension spring 13. The holding element 14 is attached to an upper corner of the bag 7 of powder. The support arm 12 and the holding element 14 fixed thereto are arranged at such a height on the bracket 11 that the bag 7 still completely filled with powder 6 and gripped by the holding element 14 is held in an upright position. In this position, the tension spring 13 is at least partly extended so that it is under tensile stress and exerts a tensile force. When the bag 7 is partly empty, it is raised by the holding element 14 under the tensile force exerted by the spring 13 so that the bag 7 moves into an inclined position with the lowest point inside the bag 7 situated diametrically opposite the gripping point of the holding element 14. The effect of this is that, when the powder-form detergent 6 is removed under suction from the bag 7, as will be described in more detail hereinafter, the suction lance 21 (see FIG. 3) likewise described in more detail hereinafter moves into the lowest corner of the bag 7 as the bag emptying process continues and thus ensures independent and complete emptying of the bag 7. In addition, the bracket 11 is provided in the region of its gallows with a suction lance guide 15 which holds the suction lance 21 arranged at the end of the suction line 5 and described in more detail hereinafter. The suction lance guide 15 is arranged at such a height on the bracket 11 that the suction lance 21 is loosely guided by the suction lance guide 15 and is held in a position in which it dips into the powder 6 from above through an opening 16, more particularly in the form of a slit, in the bag 7.

The suction line 5 which leads into the lower part 3 of the stock liquor tank 2 and which terminates in the bag 7, dipping into the powder-form detergent 6, is flexible and, in particular, is in the form of a flexible hose. At its end remote from the stock liquor tank 2, the suction line 5 terminates in a flanged-on suction pipe 17, as can be seen in particular in FIG. 3. On the side remote from the connecting flange 18, a tubular jacket 19 surrounding the suction pipe 17 is fixed thereto. The tubular jacket 19 has an internal diameter which is larger than the external diameter of the suction pipe 17, so that an annular gap 20 is formed between the outside of the suction pipe 17 and the inside of the tubular jacket 19. On that side remote from the flange 18, the suction pipe 17 projects slightly, i.e. by about 10 mm, beyond the end of the tubular jacket 19, so that an annular nozzle is formed in this zone by the front ends of the tubular jacket 19 and the suction pipe 17. The tubular jacket 19 and the suction pipe 17 together form the suction lance globally denoted by the reference 21. In addition, a cage-like protective basket 22 in the form of a half shell with individual wires spaced apart from one another is fixed to the suction lance 21 at that end of the tubular jacket 19 remote from the flange 18, projecting beyond the end of the tubular jacket 19 and the suction pipe 17. In addition, a web-like flow resistance element (not shown) may be internally arranged at the lower end of the suction pipe 17, preferably coaxially of and/or concentrically to the suction pipe 17. The lengths of the suction pipe 17 and the tubular jacket 19 are such that the suction lance 21 projects from the bag 7, even when its suction end surrounded by the protective basket 22 is situated at the lowest point of the bag 7 of powder. The suction pipe 17 is longer than the tubular jacket 19, the outside of the tubular jacket 19 being loosely held in and guided by the lance guide 15.

Figure 5:
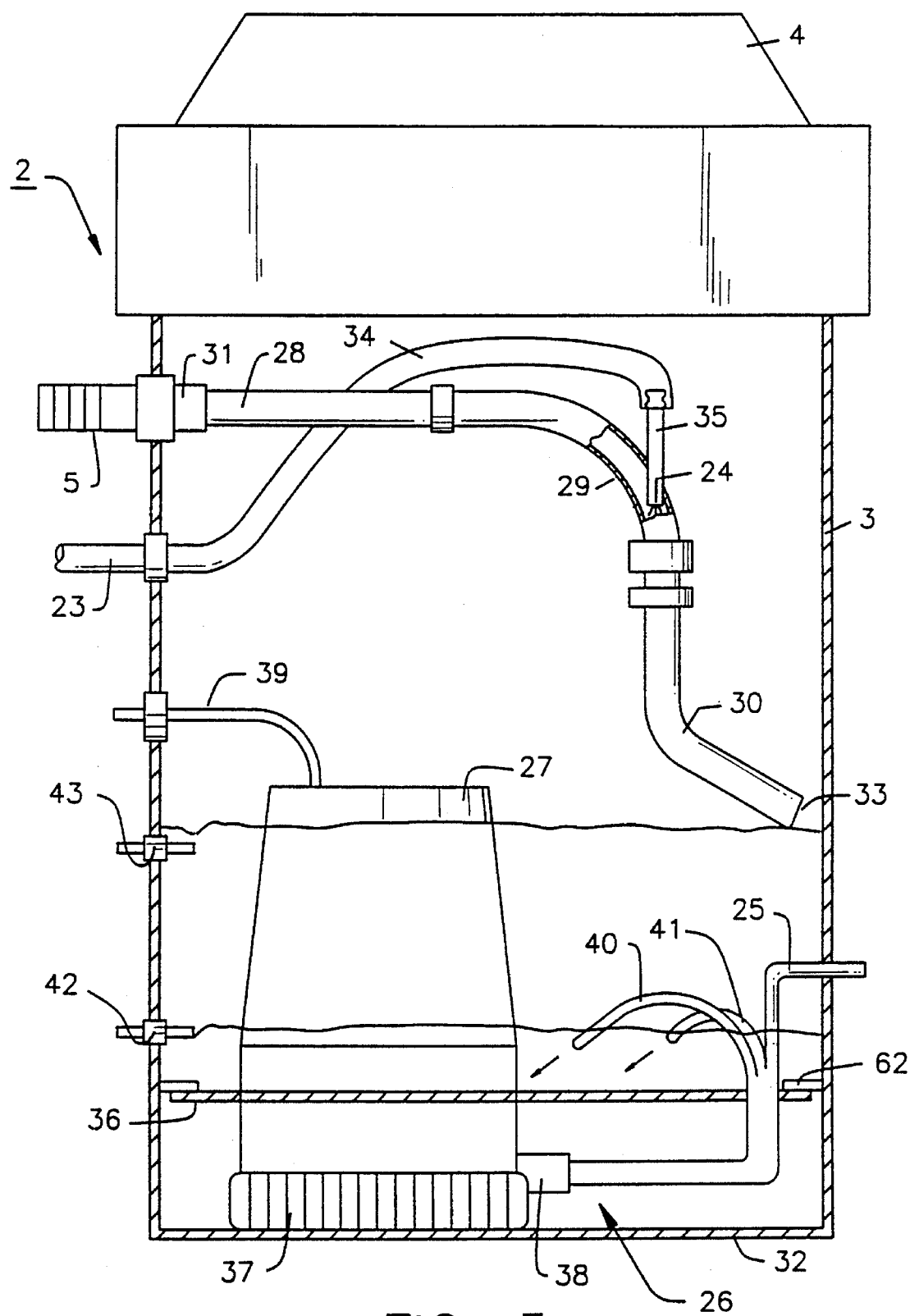
FIG. 5 is a schematic view of the lower part of the stock liquor tank illustrated in FIG. 1.

As shown in FIG. 5, both the suction line 5, and also a fresh water line 23 open into the lower part 3 of the stock liquor tank 2. On the inside of the stock tank, the water outlet opening 24 of the fresh water line 23 is directed onto a stream of powder to be drawn into the lower part 3 through the suction line 5. A stock liquor line 25 projecting from the stock liquor tank 2 with a stock liquor inflow 26 towards the bottom of the stock liquor tank is formed in the lower part 3. On the inside of the stock liquor tank 2, the stock liquor line 25 communicates with a pump 27 and, outside the stock liquor tank 2, leads in the form of a pipe coupling to one or more institutional dishwashing or washing machines to be supplied with stock liquor from the stock liquor tank 2.

Starting from the point where it enters the lower part 3, the suction line 5 is extended into the lower part 3 by a pipe 28 which is attached to the suction line 5 by means of a flange 31 and which is sealingly inserted into the wall of the lower part 3 of the stock liquor tank 2. The pipe section 28 is adjoined by a 90° bend 29 or elbow directed towards the base 32 of the tank. Fitted to the bend 29 is another curved pipe section 30 of which the opening 33 terminates just before the inner wall of the lower part 3 of the container. In an embodiment which has not been shown, the pipe section 30 has an enlarged free internal cross-section at its opening 33 and thus represents a diffusor. The pipe sections 28, 29 and 30 form an extension of the suction line 5 on the inside of the stock liquor tank 2 through which powder can be taken under suction into the stock liquor tank 2. In this way, the opening 33 of the suction line 5 on the inside of the stock liquor tank 2 is designed in such a way that it is arranged at a distance from the point where the first suction line 5 enters the lower part 3 and below the point where the suction line 5 enters the lower part 3. Inside the stock liquor tank 2, the fresh water line 23 is in the form of a hose in an extension on the inside of the stock liquor tank from the point where it enters the lower part 3 to the bend 29 of the suction line 5 and opens at a water outlet opening 24—directed towards the bottom 32 of the tank—by way of a hose nozzle 35 introduced tangentially into the bend 29.

Below the opening 33 of the suction line 5 on the inside of the stock liquor tank, a filter plate 36 is arranged in the lower part 3 at a distance from the bottom 32 of the tank, 2 covering substantially the entire base area of the lower part 3.

The pump 27 arranged in the lower part 3 is in the form of an immersion pump 27 which is mounted on the base 32 of the tank and of which the intake opening 37 and the delivery opening 38 communicating with the stock liquor inflow 26 of the stock liquor line 25 on the pressure side are arranged below the filter plate 36. Starting the immersion pump 27, an electrical connection 39 for supplying power to the immersion pump 27 leads out from the lower part 3.

In addition, the stock liquor line 25 comprises two branches 40 and 41 in the lower part 3 which terminate just above the filter plate 36 with openings directed onto the filter plate.

Finally, a lower level control electrode 42 and, above it, an upper level control electrode 42 are arranged in the wall of the lower part 3 of the container just above the upper surface of the filter plate 36.

The stock liquor tank 2 is mounted on a mobile frame 46 comprising wheels 44 and a handle 45 in the form of a handcart or trolley. In addition, a mains coupling unit 47 and electrical switches 48 are arranged on the mobile frame 46.

Figure 6:
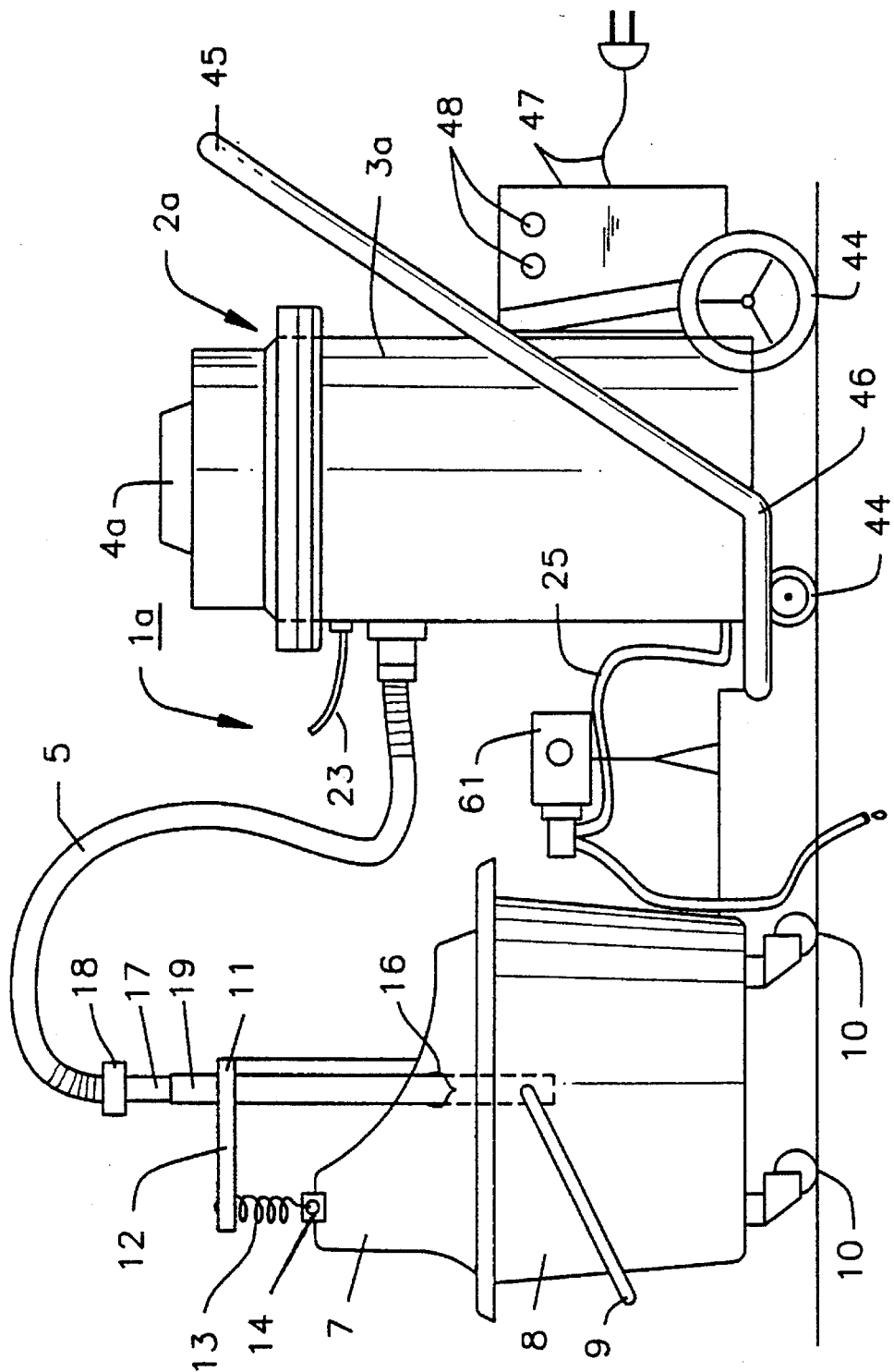
FIG. 6 is a side elevation of another embodiment of the arrangement according to the invention.
Figure 7:
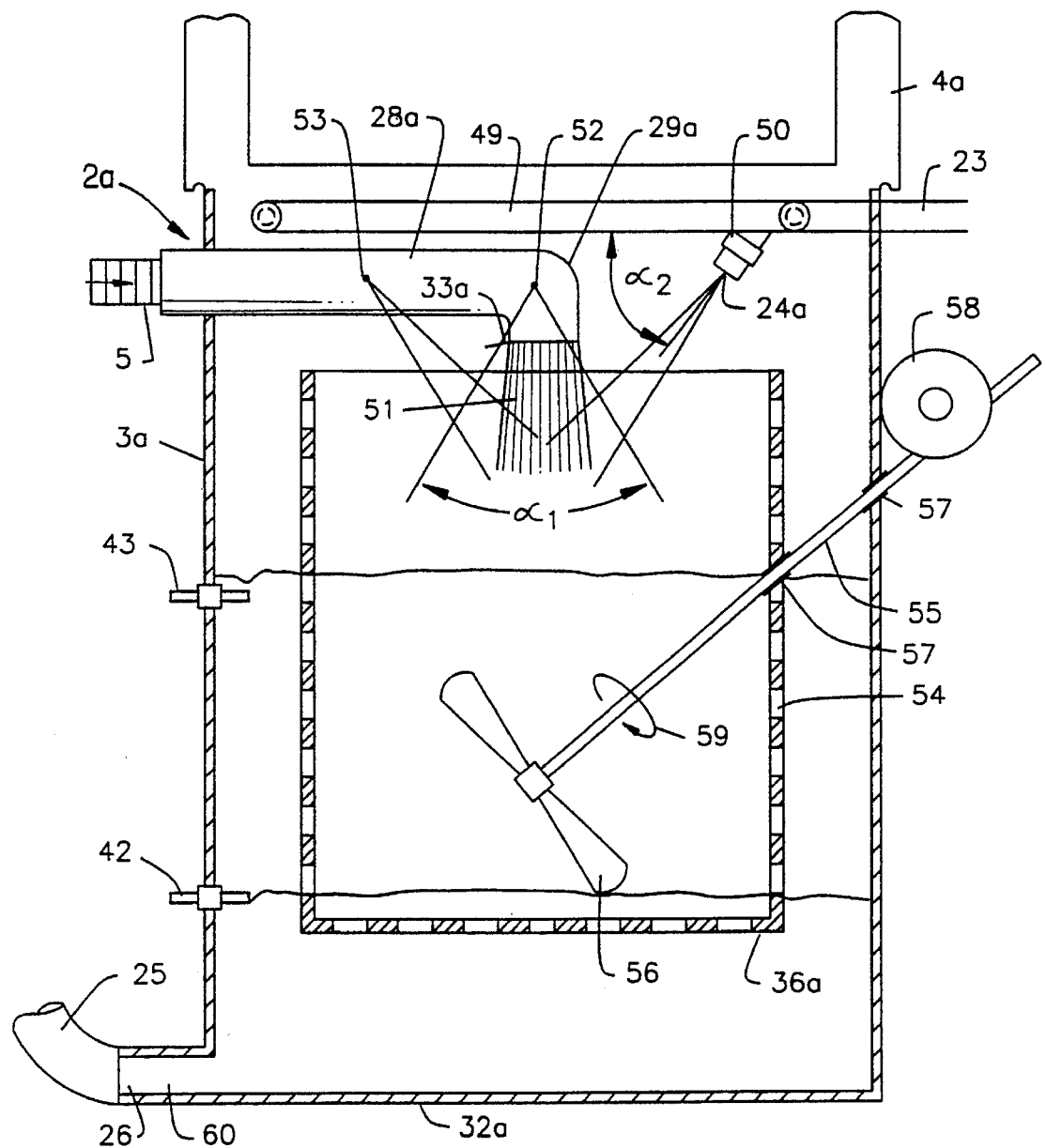
FIG. 7 is a schematic view of the lower part of the stock liquor tank shown in FIG. 6.

Another embodiment of an arrangement globally denoted by the reference la for directly preparing a stock liquor from a powder container for supplying institutional dishwashing or washing machines is shown in FIGS. 6 and 7. The only difference between this embodiment and the first embodiment described above lies in the arrangement of various elements in and on the lower part 3a of the stock liquor tank 2a. Accordingly, the same reference numerals have been used in FIGS. 6 and 7 to denote the same elements as in FIGS. 1 to 5.

The arrangement 1a consists of a stock liquor tank 2a comprising a tub-like lower part 3a and an upper part 4a sealingly mounted thereon with an integrated suction blower for producing a reduced pressure in the lower part 3a. The lower part 3a is schematically illustrated in FIG. 7. Starting from the point where it enters the lower part 3a, the suction pipe 5 opening into the lower part 3a is extended by a straight pipe 28a with an adjoining pipe bend 29a into the region of the main longitudinal axis of the preferably cylindrical lower part 3a. The opening 33a of the pipe bend 29a is directed perpendicularly of the base 32a of the stock liquor container in the principal longitudinal axis thereof. Above the pipe section 28a and the pipe bend 29a, the fresh water line 23 inside the stock liquor tank 3a is in the form of a ring line 49 concentrically surrounding the opening 33a. Four nozzles 50 directed with their orifices 24a onto a stream 51 of powder issuing from the opening 33a of the pipe bend 29a are arranged on the ring line 49. One nozzle 50 is shown in FIG. 7, the outlet openings of the other nozzles being denoted by spray cones 52, 53. The nozzles 50 are arranged at an angle of inclination $\alpha_2$ of 45° on the ring line 49. The orifices 24a of the nozzles 50 are characterized by a flat-jet opening angle of preferably 65° ($\alpha_1$). A filter basket 54 with a filter plate 36a is arranged inside the lower part 3a below the opening 33a of the extended suction line 5. Above the filter plate 36a, a stirring propeller 56 is fixed to one end of the shaft 55. The stirrer shaft 55, which is mounted on bearings 57, projects via a seal from the lower part 3a. Arranged outside the lower part 3a is an electrical drive 58 with a screwthread which engages with a corresponding screwthread on the stirrer shaft 55, so that the stirrer shaft 55 is rotatable in the direction of the arrow 59. At its base, the lower part 3a comprises an outlet 60 to which the stock liquor line 25 is connected. The stock liquor line 25 leads to a flow inducing pump 61 arranged on the frame 46 outside the stock liquor tank 2a. By means of the pump 61, stock liquor can be taken from the stock liquor tank 2a and delivered to one or more institutional dishwashing or washing machines. The stock liquor line 25 may even branch behind the outlet 60 in the direction of flow, leading through its various branches to a plurality of other pumps which then supply one or more institutional dishwashing or washing machines.

The frame 46 and the trough-like or bucket-like container 8 may be interconnected (not shown) so that they can be moved as a unit, for example by the operator gripping the handle 45.

The following procedure is adopted for directly preparing a stock liquor from the powder container 7 for supplying institutional dishwashing or washing machines using the arrangements 1 and 1a according to the invention.

The powder-form detergent 6 is drawn through the suction line 5 into the lower part 3;3a via the suction lance 21 consisting of the tubular jacket 19 and the suction pipe 17.

The reduced pressure required for this purpose is generated by the suction blower integrated in the upper part 4;4*a*. In the arrangement 1, the powder 6 taken in is mixed in the pipe bend 29 with water issuing from the opening 24 of the extended fresh water line 23 and flows from the opening 33 into the lower part 3. After the powder has dissolved, the mixture of detergent powder and water forms the stock liquor with which institutional dishwashing or washing machines are supplied with detergent. The stock liquor is collected and kept ready in the lower part 3.

In the arrangement 1*a*, the powder 6 taken in is not mixed with water in the extended suction line 5, instead the stream 51 of powder issuing from the pipe bend 29*a* is engaged by the jets of water issuing from the orifices 24*a* of the nozzles 50 and deposited in the lower part 3*a*.

The filter plate 36 arranged in the lower part 3 in the arrangement 1 and the filter basket 54 arranged in the lower part 3*a* of the arrangement 1*a* have a mesh width of approximately 0.2 mm, so that relatively coarse, undissolved powder particles can be retained by the filter plate 36 and the filter basket 54 until they dissolve. In the arrangement 1, the immersion pump 27 in the form of a circulation pump, in conjunction with the branches 40 and 41 of the stock liquor line 25, ensures that stock liquor is continuously circulated in the tank which prevents undissolved powder particles from settling on the filter plate 36 and accelerates their dissolution. In the arrangement 1*a*, the same function is performed by the rotating propeller stirrer 56.

In the arrangement 1, the stock liquor formed in the lower part 3 is taken in under suction through the intake opening 37 of the pump 27 at the bottom 32 of the container 3 and pumped into the second stock liquor line 25. For example, a magnetic valve is provided outside the arrangement 1 in the stock line 25 before the particular dishwashing or washing machine to be supplied, being opened by a conductivity measuring probe arranged in the tank of the dishwashing or washing machine for supplying the particular machine with fresh stock liquor when the conductivity measuring probe detects a fall in concentration in the washing tank. When the magnetic valve is closed, stock liquor is merely circulated inside the stock liquor tank 2 by the circulation pump 27. In the arrangement 1*a*, stock liquor is taken from the stock liquor tank 2*a* to supply connected dishwashing or washing machines when the membrane pump or flow inducing pump 61 is actuated. This can also be initiated, for example, by the measuring signal of a conductivity measuring probe arranged in the tank of a dishwashing or washing machine.

In both the arrangements 1 and 1*a*, the stock liquor is prepared and kept ready in batches. When the lower filling level of the stock liquor in the particular stock liquor tank 2;2*a* reaches the lower level detected by the lower level control electrode 42, both the suction blower and the inflow of fresh water through the fresh water line 23 are actuated. When the filling level of the stock liquor in the stock liquor tank 2;2*a* reaches the upper level detected by the upper level control electrode 43, the suction blower is immediately switched off in both arrangements whereas the inflow of fresh water continues for about 3 to 4 seconds to ensure that any powder taken in as the blower slows down is also mixed with water so that no dust is emitted in the lower part 3;3*a*. The lower level control electrode 42 is arranged at such a height that the stock liquor tank 2;2*a* cannot be emptied. The upper level control electrode 43 is arranged at such a height that no stock liquor is able to enter the opening 33;33*a*.

The stream of powder drawn through the suction line 5 into the stock liquor tank 2;2*a* and the inflow of fresh water through the orifices 24;24*a* into the stock liquor tank 2;2*a* respectively are adapted to one another in quantity terms in such a way that the stock liquor prepared in the stock liquor tank 2;2*a* has a concentration of about 50 to 120 g/l. Control is possible via the inflow of water and the suction effect of the suction blower, for example by graduating the suction blower motor. In the arrangement 1*a*, control is also possible by varying the number of nozzles 50, the diameter of the nozzle orifices or the water pressure built up, for example by means of an intermediate pressure reducer. To this end, the fresh water line 23 is optionally preceded before its point of entry into the lower part 3;3*a* by a shutoff cock, a pressure reducer with a manometer for pressure control and a throttle valve, a pipe separator and a magnetic valve.

In addition, the quantity of powder taken in can be established in advance within wide limits through the preferably variable web-like flow resistance element in the suction pipe 17.

Accordingly, in the arrangement 1, the stock liquor is prepared by powder 6 being taken in through the pipe section 28 and the pipe bend 29. Fresh water is tangentially delivered in the pipe bend 29 and mixes with the powder. The powder/water mixture is then guided onto the inner wall of the lower part 3 through the further pipe section 30, preferably issuing from the opening 33 in a stream directed tangentially and obliquely downwards. In this way, the issuing powder/water mixture is prevented from spraying upwards. The immersion pump 27 is mounted on the base 32 of the container and, through its intake opening 37, takes in the stock liquor prepared in the lower part 3 through dissolution of the powder in the powder/water mixture introduced. The intake opening 37 of the immersion pump 27 is situated below the filter plate 36. The upper surface of the filter plate 36 presses tightly against the underneath of a lip seal 62 arranged around the inner wall of the lower part 3, so that no powder particles larger than 0.2 mm in size can be taken in by the pump 27. On the pressure side, the pump 27 pumps the stock liquor into the stock liquor line 25 which branches above the filter plate 36 in the lower part 3. Through one of the branches, stock liquor is pumped from the stock liquor tank 2 through the pipe 25 and then through a magnetic valve (not shown) to the institutional dishwashing or washing machine(s). Through the other two branch lines 40 and 41, pumped stock liquor is directed onto the upper surface of the filter plate 36. The openings of the branch lines 40 and 41 are directed tangentially onto the filter plate 36 in such a way that a stirring or whirling effect is obtained, preventing any undissolved particles of the detergent powder from settling on the filter plate 36.

In the arrangement 1*a*, the stream 51 of powder 6 taken in issues vertically downwards through pipe bend 29*a*. Immediately after the stream 51 of powder 6 has left the pipe bend 29*a*, flat water jets issuing from the nozzles 50 directed radially inwards and downwards impinge on the stream 51 of powder 6 and deposit the powder 6. The powder/water mixture formed is collected in the filter basket 54. Stock liquor is formed by dissolution of the powder 6, The stock liquor is drawn under suction from the lower part 3*a* through the outlet 60, the mesh width of the filter basket 54 ensuring that no powder particles larger than 0.2 mm in size leave the stock liquor tank 2*a*. The stock liquor is drawn under suction from the stock liquor tank 2*a* through the outlet 60 by the flow-inducing pump 61 or optionally a membrane pump and delivered to one or more institutional dishwashing or washing machines.

To guarantee problem-free intake of the powder 6, the suction line 5 is provided with the suction lance 21 formed from the suction pipe 17 and the tubular jacket 19 and the protective basket 22. Air is taken in through the annular gap 20 to that end of the suction pipe 17 and tubular jacket 19 which is in the form of an annular nozzle, the protective basket 22 preventing the suction lance 21 from sinking too deeply into the powder 6 and creating an empty space for the development of a turbulence zone in which the powder 6 is whirled around (as indicated by arrows 63). Air taken in enters the annular gap 20 in the direction of the arrow 64. The powder/air mixture is drawn into the suction line 5 through the suction pipe 17 in the direction of the arrow 65.

The web-like flow resistance element can occupy up to 80% of the cross-section of the suction pipe 17. It regulates the quantity of powder taken in, preferably at high suction levels, which in turn prevent powder from being deposited in the hose.

In its operating position, the suction lance 21 is loosely guided in the suction lance guide 15 which guarantees tilt-free guiding of the suction lance 21 as it gradually sucks up the powder 6 present in the bag 7 under the suction effect.

The holding element 14 dependingly fixed to the support arm 12 by means of the tension spring 13 prevents the bag 7 from collapsing as the emptying process continues and in addition ensures that, under the suction effect, the tip of the suction lance moves automatically into the diametrically opposite corner of the bag, thus ensuring the complete emptying of the powder from the bag 7.

What is claimed is:

1. An apparatus for directly preparing a stock wash liquor from a powder container for supplying institutional dishwashing or washing machines, comprising:

a stock liquor tank formed by a tub-like lower portion;

an upper portion including an integrated suction blower for generating a reduced pressure in said stock liquor tank, said upper portion being sealingly mounted upon said stock liquor tank;

a powder container containing wash powder;

a suction line having two open ends, one end being located within said stock liquor tank, and another end being remote from said stock liquor tank and located for dipping into the powder in said powder container;

a fresh water line having one end within said stock liquor tank, a water outlet opening located for directing water onto a stream of powder drawn through said suction line, from said container into said stock liquor tank;

a stock liquor inflow port located at the bottom of said stock liquor tank, for feeding stock liquor therefrom;

a pump for pumping stock liquor from said stock liquor tank; and a stock liquor line connected between said stock liquor inflow port and said pump, for feeding stock liquor to said pump.

2. An apparatus as claimed in claim 1, wherein the stock liquor line is connected to at least one institutional dishwashing or washing machine.

3. An apparatus as claimed in claim 1, wherein the open end of the suction line on the inside of the stock liquor tank is arranged at a distance from the point where the suction line enters the stock liquor tank.

4. An apparatus as claimed in claim 1, wherein the open end of the suction line on the inside of the stock liquor tank is positioned below the point where the suction line enters the stock liquor tank, and the water outlet opening of the fresh water line on the inside of the stock liquor tank is likewise positioned below the point of entry of the suction line.

5. An apparatus as claimed in claim 1, wherein the suction line comprises an elbow or bend directed downwards towards the bottom of the stock liquor tank in an extension of said suction line on the inside of said stock liquor tank.

6. An apparatus as claimed in claim 5, wherein in an extension on the inside of the stock liquor tank with said water outlet opening directed towards the bottom thereof, the fresh water line opens into the bend of said suction line and, after the bend, the suction line continues to a point situated close to an inner wall of the stock liquor tank.

7. An apparatus as claimed in claim 5, wherein in its extension on the inside of the stock liquor tank with said bend, the suction line terminates in a longitudinal axis of the stock liquor tank with its opening directed towards the bottom of the tank and, in its extension on the inside of the stock liquor tank, the fresh water line is formed above the opening of said suction line by a ring line concentrically surrounding the opening and delivering a jet of water directed onto a stream of powder issuing from the suction line from preferably four nozzles inclined at an angle ($\alpha_2$) of preferably 45° for a flat-jet opening angle ($\alpha_1$) of preferably 65°.

8. An apparatus as claimed in claim 1, further including a filter plate arranged in a lower part of said stock liquor tank below the opening of the suction line on the inside of the stock liquor tank.

9. An apparatus as claimed in claim 8, further including said pump being an immersion pump with an intake opening below the filter plate towards the bottom of the tank and a delivery opening communicating with the stock liquor line on the pressure side is arranged in the stock liquor tank.

10. An apparatus as claimed in claim 9, wherein the stock liquor line has branches located in the stock liquor line of which the openings are directed onto the top of the filter plate.

11. An apparatus as claimed in claim 1, wherein said pump consists of a flow-inducing pump, and is arranged in the stock liquor line outside the stock liquor tank.

12. An apparatus as claimed in claim 8, further including a stirrer rotatably mounted above the filter plate in the stock liquor tank.

13. An apparatus as claimed in claim 1, further including an outlet in the base of the stock liquor tank with a stock liquor line connected thereto.

14. An apparatus as claimed in claim 1, wherein the stock liquor line comprises branches outside the stock liquor tank for supplying several dishwashing or washing machines.

15. An apparatus as claimed in claim 1, further including two level control electrodes arranged on an inner wall of the stock liquor tank.

16. An apparatus as claimed in claim 1, further including the stock liquor tank mounted on a frame including wheels and a handle in the form of a handcart or trolley.

17. An apparatus as claimed in claim 16, further including a mains coupling unit and electrical switches arranged on the roller-mounted frame.

18. An apparatus as claimed in claim 16, further including at least one pump mounted on the frame.

19. An apparatus as claimed in claim 1, wherein the suction line is flexible and, more particularly, is in the form of a hose.

20. An apparatus as claimed in claim 1, further including on its side remote from the stock liquor tank, said suction line terminating in a suction lance which dips into the powder container, and which comprises a suction pipe and a tubular jacket surrounding the suction pipe with an annular gap in between and projecting from the powder container at one end, the suction pipe and the tubular jacket forming an annular nozzle at the end of the suction pipe situated inside the powder container.

21. An apparatus as claimed in claim 20, further including on the inside of the powder container, said suction lance having a cage-like protective basket projecting beyond the end of the suction pipe.

22. An apparatus as claimed in claim 20, further including a flow resistance element within a lower end of said suction pipe.

23. An apparatus as claimed in claim 1, wherein the powder container includes a bag placed in a trough-like or bucket-like container, a gallows-like bracket being associated with the container on one side, and arranged thereon and comprising a holding element depending from a support arm and a guide for the suction lance, the support arm and the guide for the suction lance each being arranged at such a height above the container that the bag is gripped by the holding element at one upper corner, i.e. is held in an upright position, and the suction lance is held—loosely guided by its guide—in a position in which it dips into the powder from above through an opening, more particularly a slot-like opening, in the bag.

24. An apparatus as claimed in claim 23, further including said holding element being fixed to either of the support arm or to the gallows-like bracket by a tension element exerting a tensile force.

25. An apparatus as claimed in claim 23 further including wheels or rollers fitted to the base of the powder container.

26. A method for directly preparing a stock liquor from a powder container for supplying institutional dishwashing or washing machines, comprising the steps of:

drawing powder-form detergent under suction from the powder container into a stock liquor tank for containing stock liquor; and preparing the stock liquor by the steps of;
  directing a jet of water onto an inflowing stream of powder; and
  pumping the stock liquor as required from the stock liquor tank to one or more dishwashing or washing machines.

* * * * *